United States Patent
Annati

(10) Patent No.: US 7,469,725 B2
(45) Date of Patent: Dec. 30, 2008

(54) METHOD AND APPARATUS FOR ACCURATELY DELIVERING A PREDETERMINED AMOUNT OF FUEL TO A VEHICLE

(75) Inventor: Richard E. Annati, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 358 days.

(21) Appl. No.: 11/359,733

(22) Filed: Feb. 22, 2006

(65) Prior Publication Data

US 2007/0193650 A1  Aug. 23, 2007

(51) Int. Cl.
B65B 3/04 (2006.01)
B65B 39/02 (2006.01)
B67C 3/02 (2006.01)
B67C 11/02 (2006.01)
F16K 31/18 (2006.01)
B64D 37/16 (2006.01)

(52) U.S. Cl. .............. 141/1; 141/95; 141/205; 141/337; 141/344; 137/426; 137/448; 244/135 A

(58) Field of Classification Search .......... 141/83, 141/95, 96, 114, 198, 199, 205, 10, 312, 141/331, 337, 344.1; 137/426, 448; 244/135 R, 244/135 A, 135 B, 135 C
See application file for complete search history.

(56) References Cited

U.S. PATENT DOCUMENTS

| | | | |
|---|---|---|---|
| 3,650,303 A * | 3/1972 | Chambers et al. | 141/1 |
| 3,734,149 A * | 5/1973 | Hansel | 141/350 |
| 3,938,564 A * | 2/1976 | Jones | 141/352 |
| 5,634,505 A * | 6/1997 | Wong | 141/349 |
| 5,868,179 A * | 2/1999 | Hartsell, Jr. | 141/198 |
| 6,237,647 B1 * | 5/2001 | Pong et al. | 141/94 |
| 6,338,372 B1 * | 1/2002 | Aksal | 141/198 |
| 6,619,341 B2 * | 9/2003 | Cushing | 141/198 |
| 6,719,021 B1 * | 4/2004 | Jwu | 141/331 |
| 7,048,020 B2 * | 5/2006 | Durieux et al. | 141/382 |
| 7,182,109 B2 * | 2/2007 | Kolberg | 141/301 |
| 2005/0052080 A1 * | 3/2005 | Maslov et al. | 307/10.1 |
| 2005/0236066 A1 * | 10/2005 | Reinhardt et al. | 141/199 |

* cited by examiner

Primary Examiner—Timothy L Maust
Assistant Examiner—Nicolas A Arnett
(74) Attorney, Agent, or Firm—McDonnell Boehnen Hulbert & Berghoff LLP

(57) ABSTRACT

A system for accurately measuring and delivering a predetermined amount of fuel to a vehicle for a specified mission. This system rapidly refuels vehicles to a specific wet vehicle weight. The fuel loading value is determined based upon an algorithm, which accounts for interactions of mission duration, and/or mission payload weight, and/or mission environmental effects. The fuel loading is accomplished by using one or more measuring tubes with a floating valve, which precludes the continued flow of fuel into the tank when the predetermined amount of fuel is delivered. The measuring tubes can be of specific lengths each corresponding to an output of the algorithm or a single telescoping tube that enables varying the length of the tube. Each unique tube length corresponding to a unique output of the algorithm. An alternative system comprises different sized fuel bladders. These systems enable a rapid foolproof method of refueling.

14 Claims, 5 Drawing Sheets

METHOD AND APPARATUS FOR ACCURATELY DELIVERING A PREDETERMINED AMOUNT OF FUEL TO A VEHICLE

GOVERNMENT RIGHTS

The United States Government has acquired certain rights in this invention pursuant to Government Contract No. MDA972-01-9-0018, awarded by the Defense Advanced Research Projects Agency.

BACKGROUND OF THE INVENTION

1. Field of the Invention (Technical Field)

The present invention relates to fuel loading of vehicles and more specifically to a method and apparatus for determining a specific fuel amount required for a number of variable conditions and an apparatus for accurately delivering the predetermined fuel amount to the vehicle.

2. Background Art

The arena of unmanned aerial vehicles (UAV's) includes many types of vehicles performing many types of missions. Various fixed wing UAV's (FWUAV's) and vertical take off and landing UAV's (VTOLUAV's) exist and continue to emerge. UAV's exist in a variety of sizes from full-scale airplanes to micro aerial vehicles (MAV's), which can be as small as a few inches along their major axis. MAV's exist in fixed wing configurations (FWMAV's) and vertical take off and landing configurations (VTOLMAV's).

VTOLUAV's require more fuel-burn per unit payload-hour than do FWUAV's. VTOLMAV's require even more fuel-burn per unit payload-hour than do the larger VTOLUAV's. VTOLMAV's in particular are challenging the design parametric trade for optimization of total wet vehicle weight, payload weight, environmental conditions and time aloft or mission duration.

The design trade space consists of some key parameters that must be considered for variability. The first parameter is the environmental operational envelope variability in air density due to temperature and altitude. These conditions can vary from sea level standard day (SLSD) to 12K ft. altitude hot day for UAV's flying at low above ground level (AGL) missions to above 40K ft. altitude for UAV's flying high AGL missions. Another important parameter is the environmental operational envelope variability due to cross/gusting and head/tail wind conditions, and the changes in AGL that the UAV is exposed to during a mission. Of course, the other key parameters are the mission duration or the desired time aloft for the UAV and the payload weight.

Consideration of all of the above result in a specific and unique fuel loading or "wet" vehicle weight for each of many conceivable mission scenarios. Many different UAV's can be designed, each of which to satisfy a specific combination of the mission parameters of environmental envelope, duration and payload. The principal difference between these various possible vehicles is the size of the fuel tank.

Maximization of both payload capability and mission duration in UAV's is of great interest. The maximization of these two operational parameters is performed at a particular vehicle design-point condition of altitude, temperature, and resulting total vehicle wet weight. The UAV's fuel is accordingly sized. If sea level standard day (SLSD) is selected for the design point and the parameters optimized, the UAV may not be able to operate in the degraded performance conditions of higher altitude (i.e.: for the selected SLSD design point weight and mission duration the UAV may not have enough power to lift off at higher altitudes.)

Conversely, if a high altitude and standard temperature are selected for the UAV's design point, the UAV will have unexploited capacity (in terms of additional payload weight and/or additional mission duration or time aloft) when it is operated at SLSD conditions. The UAV may be loaded with greater weight payload, but the conventional design-point specific approach will not allow additional fuel for greater time aloft at the SLSD condition.

In order to have one vehicle designed to meet the myriad of combined mission parameter possibilities there is a need to be able to quickly fuel load UAV's to differing fuel amounts that correspond to each unique mission need of environmental envelope, duration and payload. This results in a specific wet vehicle weight and a corresponding desired fuel load, which is specific to each unique mission. Also, in order to quickly conduct the refueling to a specific fuel level it must be performed independent of knowing the level of any residual fuel remaining in the fuel tank from any prior mission or use.

Another important consideration encountered with the military application of UAV's is that the vehicles may be launched by soldiers that are in harms way. Time may often be of the essence when refueling a UAV for launch. Further, the fueling system must be lightweight and simple for field use.

There are several conventional methods that are currently available, however their shortcomings are obvious. A dipstick can be utilized, which is a trial and error method consisting of check-fill-check-repeat. Overfilling is a danger with this process and recovering from an overfill condition is difficult, time consuming and messy. Another device is a sight glass. These devices come in various types, but they all add weight and complexity to the vehicle. Weight is a paramount premium in UAV design. Manual fluid measurement prior to filling have also been used. Prior to initiating the refueling process with this method there is a need to know the amount of residual fuel remaining in the tank, which requires dipsticking or some other supporting method all of which is time consuming. On-board fuel level indicators also exist consisting of various mechanical float and/or electromechanical devices (i.e.: gas gauge as in a typical automobile) all of which add weight and complexity to the vehicle.

All of the above mentioned conventional methods add weight to the air vehicle and/or require time via a concerted effort to fuel the vehicle a predetermined amount. Most of the conventional methods preclude the ability to rapidly fuel the vehicle with a predetermined amount of fuel.

SUMMARY OF THE INVENTION (DISCLOSURE OF THE INVENTION)

The present invention is a fool proof method and apparatus for determining a precise amount of fuel for a mission based on several factors. Further, a set of precision sized fuel loading tubes or a telescoping tube with interlocking sized tubes, all with similar precision volume content are provided to insert-into the fuel tank and deliver the determined precise amount of fuel. A floating flapper valve can also be included to prevent overfilling conditions. Also, various precision sized soft wall fuel bladders can be utilized as a variable volume fuel tank when installed within a hard wall enclosure within the vehicle. The various precision sized fuel bladders can further be utilized to pre-select fuel volumes that can be fueled into the vehicle fuel tank from the bladder.

A primary object of the present invention is to provide an apparatus and method for refueling a vehicle that eliminates "guesswork" and time consuming measurements.

Another object of the present invention is to provide a refueling process which is independent of the fuel level existing in the vehicle.

A primary advantage of the present invention is that it minimizes the time to measure fuel quantity, which is very undesirable for a soldier in harms way.

Another advantage of the present invention is that it does not add weight to the vehicle since the device is removed from the vehicle upon completion of fueling process.

Yet another advantage of the present invention is that it precludes any "overfill" conditions.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

A new and unique apparatus and method for refueling a vehicle is described herein. The present is an optimum solution for providing a variable fuel loading capability that includes the elimination of guesswork and the opportunity for human error in determining the amount of fuel required via the various measurement methods and include a foolproof method to facilitate fueling to a predetermined fuel load level. In addition, the present system accounts for residual fuel remaining in the vehicle prior to initiation of re-fueling-while not adding weight to the vehicle. Further, the present invention is easily removed from the vehicle upon completion of the fueling process. The preferred system precludes any chance of an "overfill" condition, which is possible if the conventional prior art methods of dip-stick "check-fill-check-repeat" or manual fluid volume measurement are utilized. Finally, the present system is quick and easy for use by a soldier in harms way.

The present invention utilizes the fuel load as a performance variable in the design and use of a UAV. This invention provides a method and apparatus for quickly fueling a UAV to a predetermined fuel level. This invention allows for the fueling to be performed independent of whatever amount of residual fuel was in the UAV prior to initiation of the fueling process. This invention does not add weight to the UAV. With this invention the amount of fuel can be varied to account for mission specific factors including: 1) environmental conditions, and/or 2) payload weight, and/or 3) mission duration. This approach allows one vehicle to be designed, which can satisfy a number of mission specific factors. This invention consists of a mistake-proof and rapid fueling process whereby an amount of fuel that is specific to a particular mission is pre-determined with an algorithm, and then the fuel is administered to the vehicle with a mistake-proof device.

The present invention consists of an enabling process and a device. The preferred embodiment of this invention is shown in FIGS. 1-5. An amount of fuel that is specific to a particular set of mission variables is determined with an algorithm 5 and then the fuel is administered to the vehicle with a device as follows:

The enabling process consists of a fuel load prediction algorithm 5 used to determine the desired fuel level 30.

$$\text{Desired Fuel Level } Y = f(x_1)\text{Mission Duration} + f(x_2)\text{Payload Weight} + f(x_3)\text{Fuel Tank Geometry} + f(x_4 x_n)\text{Environmental Conditions}$$

Figure 6:
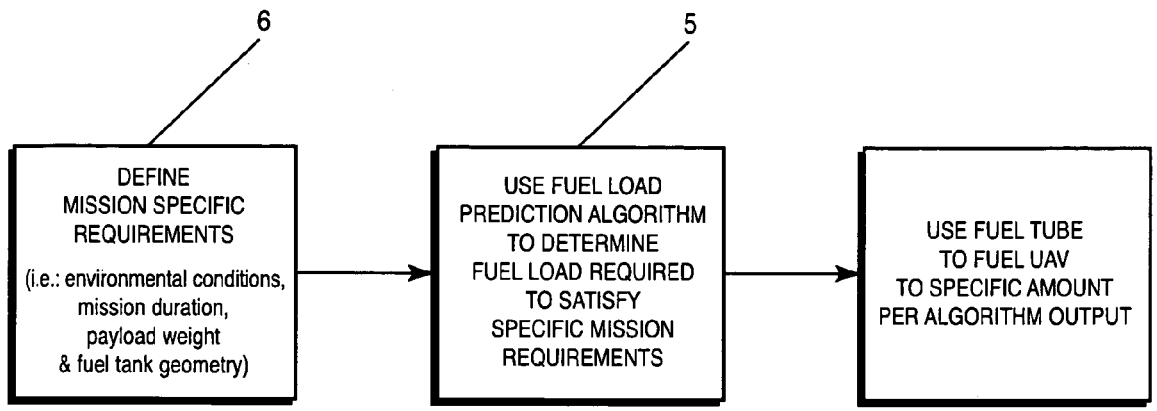
FIG. 6 is a flow chart showing the preferred fueling process steps.

Desired fuel load 30 (volume, weight or more directly level) for a specific mission can be predetermined by the algorithm 5 based upon environmental conditions (altitude, temperature, and wind), mission duration, payload weight and fuel tank geometry 6. By using algorithm 5 based on mission requirements 6, a fuel tube is selected for the predetermined amount of fuel 30 determined for that mission, as shown in FIG. 6

Figure 1:
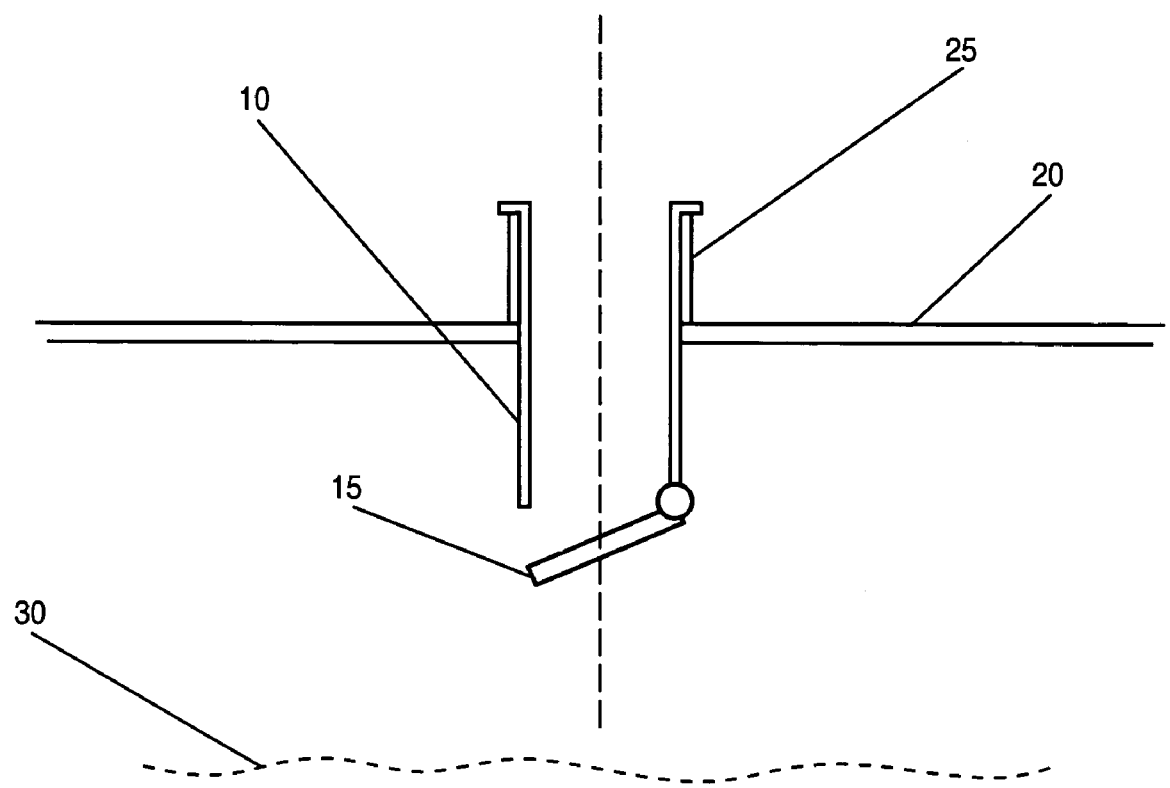
FIG. 1 shows the preferred embodiment of the invention during fueling operation.
Figure 2:
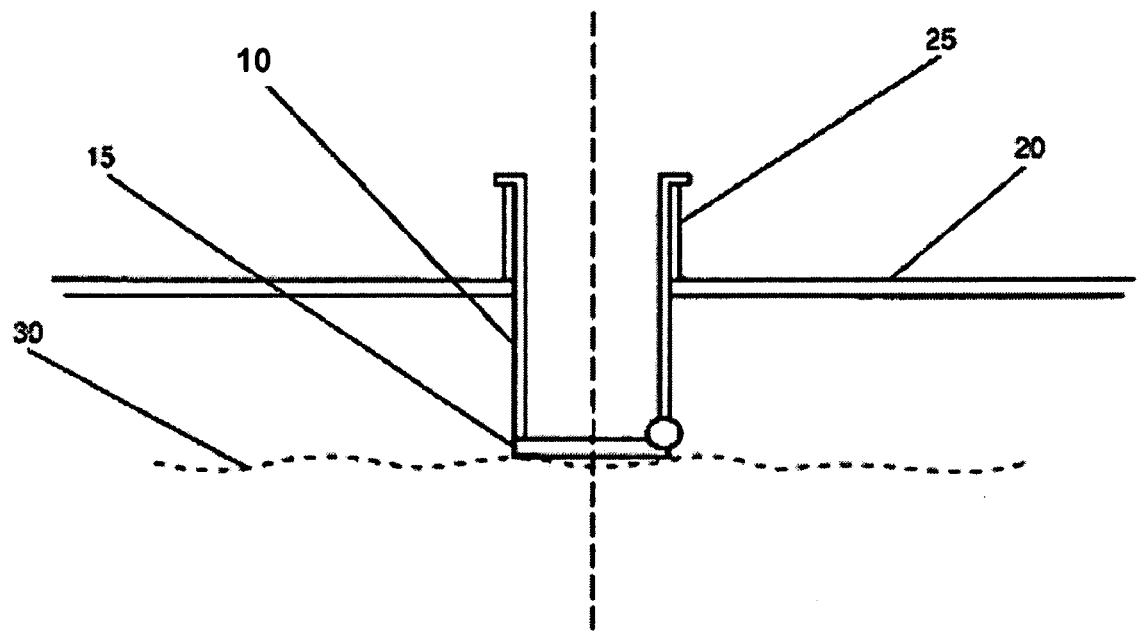
FIG. 2 shows the embodiment of FIG. 1 after the fueling operation is completed.
Figure 3:
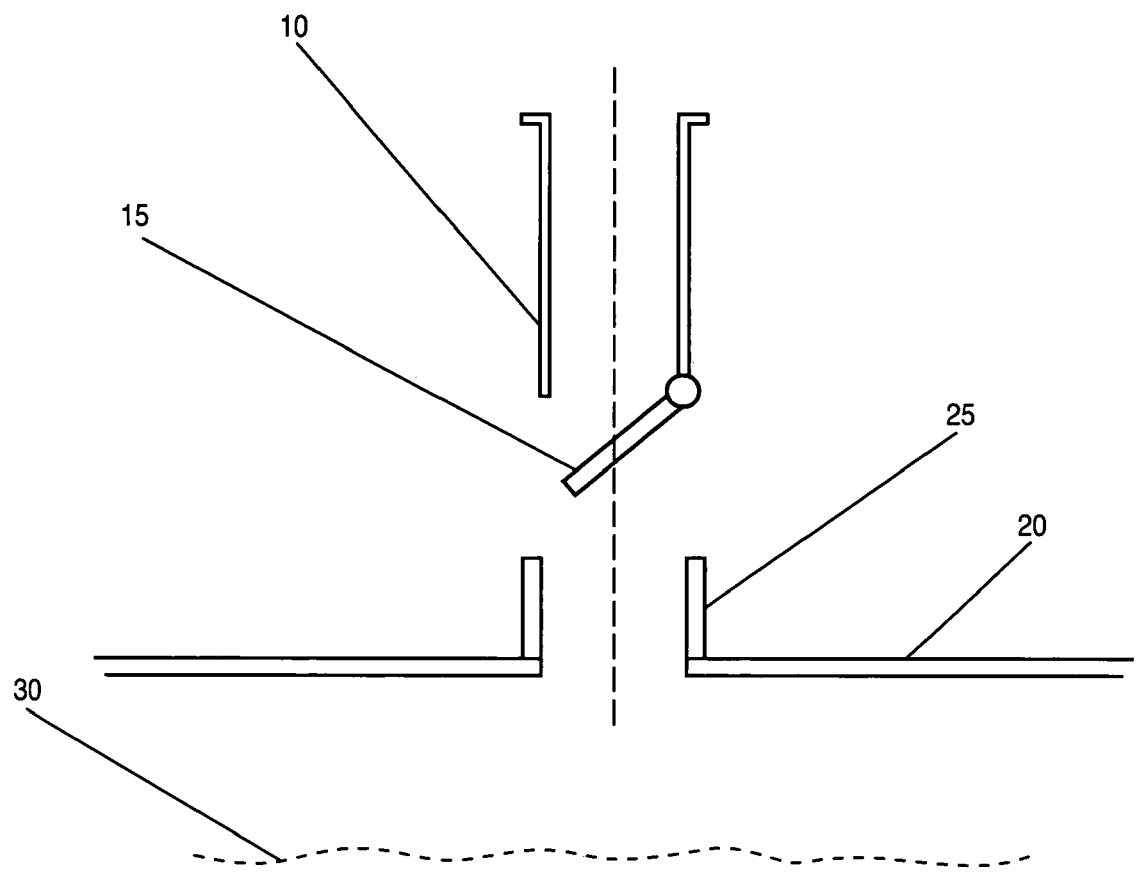
FIG. 3 shows the embodiment of FIG. 1 showing the preferred fuel tube being removed.
Figure 4:
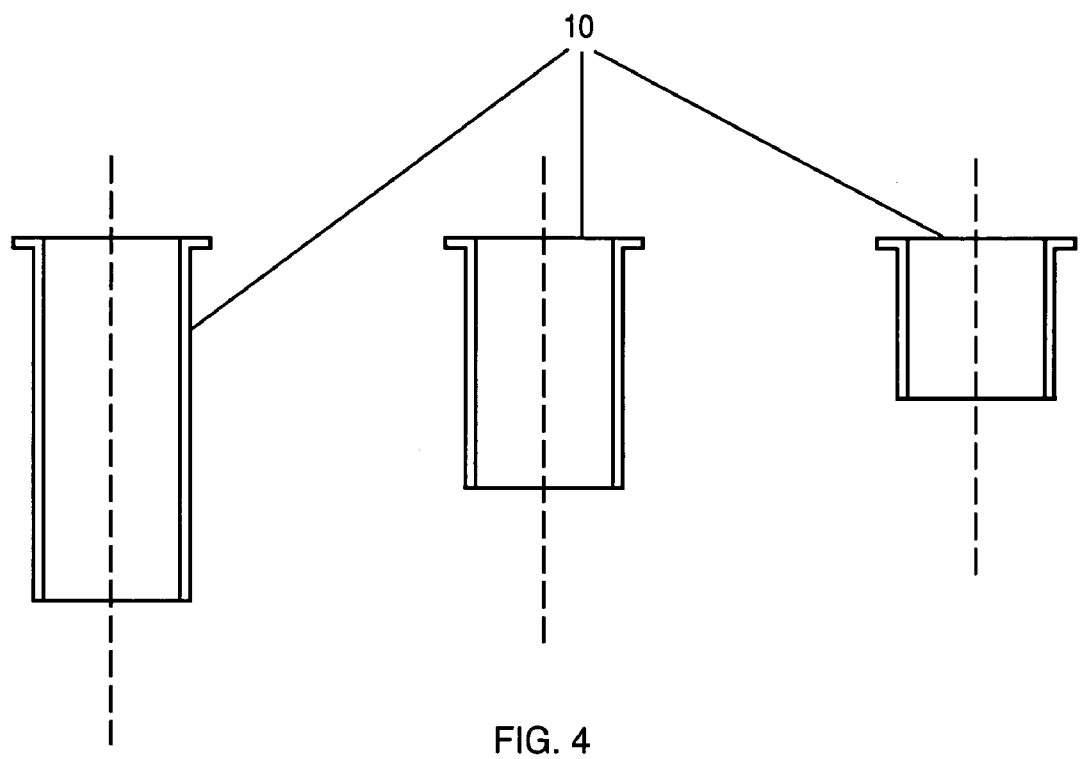
FIG. 4 shows an alternative embodiment with predetermined fuel tube lengths.
Figure 5:
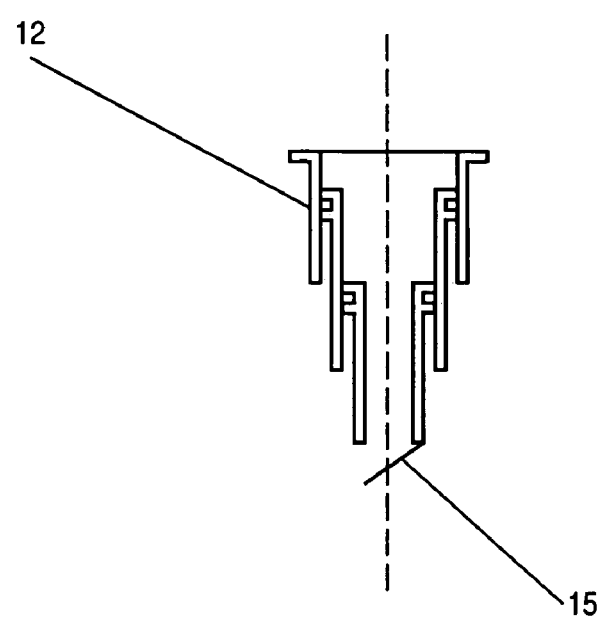
FIG. 5 shows another alternative embodiment with an adjustable telescopic fueling tube.

The present invention, as shown in FIGS. 1-5, is a fuel metering instrument. A set of fuel tubes 10, as shown in FIG. 4 or one adjustable telescoping tube 12, as shown in FIG. 5, are calibrated to specific lengths based upon the output from the fuel load prediction algorithm 5. Fuel tubes 10 include a floating check or flapper 15 valve at the base. Fuel tube 10 is manually inserted into vehicle fuel tank 20 fill spout 25. Fueling commences until fuel is seen rising within fuel tube 10. Fueling is then stopped and fuel tube 10 is removed from fill spout 25. A small amount of fuel remaining in fuel tube 10 drops into fuel tank 20 upon removal. Due to floating check valve 15 within fuel tube 10, the UAV fuel tank 20 cannot be overfilled. If the operator attempts to add too much fuel the surplus fuel will overflow from fuel tube 10 rather than entering UAV fuel tank 20.

Due to the calibration of fuel tube 10, which is inserted into the fuel tank 20 prior to initiation of the fueling process, this invention enables UAV's to be operated in a variety of degraded off design point conditions, such as higher altitude, greater temperature and/or greater payload weight. This fueling tube 10 extends into the fuel tank 20 by an amount determined by an algorithm 5. At the bottom end of the fuel tube 10 is a floating valve 15, which closes when the pre-described fuel level is reached. The floating valve 15 provides a positive stop for the fueling process. Sighting of fuel in the fueling tube 10 is an indication that the desired level has been reached 30 and the valve 15 has closed. To minimize weight, the fuel tube 10 is removed after fueling is completed. As the fuel tube 10 is lifted from the fuel tank 20 the float valve 15 opens and any residual fuel in the tube is automatically dropped into the fuel tank 20.

The present invention allows the rapid fueling of UAV's to a specific fuel level 30 that is predetermined with an algorithm 5 that is based upon mission specific variables of altitude, temperature, winds, and payload weight. This invention in-turn allows the UAV designer to optimize the UAV design for maximum time aloft and/or maximum payload. This invention provides a fool proof and rapid variable fueling method to allow UAV deployment to satisfy a variety of unique mission specific conditions.

Some number of pre-determined fuel tube lengths are designed to accommodate some number of anticipated off design point mission requirement combinations. For example three different tube lengths can be provided with one for one quarter (¼) fill, one for one half (½) fill, and one for three quarter (¾) fill, as shown in FIG. 4.

Instead of separate calibrated length fuel fill tubes, a telescoping tube 12 may be utilized. Or a series of interlocking tubes may be utilized to generate the various desired tube lengths as shown in FIG. 5. Each of the telescoping fuel tube elements nests within each other in increasing sizes. The interlocking tubes 12 can be manually compressed or expanded to a variety of predetermined overall lengths. Each resulting unique telescoping fuel tube length corresponds to a unique fueling amount based upon mission specific conditions. Telescoping tube can also have float valve 15, as in the previous embodiment.

If there is line of sight into the fuel tank fill area, a calibrated length tube may be utilized without the floating valve at the bottom. This approach reduces the cost of the apparatus, but does not provide the foolproof positive stop of the flapper valve (to prevent an overfill condition). This approach is advantageous over the conventional "dip stick" method because the real-time line-of-sight assessment of the fuel fill level allows for a rapid one-step fueling At the bottom of the tube any variety of floating valves 15 may be utilized, such as a floating ball-check valve or a floating flapper valve. Also a mechanical and/or electrical sensor can be built integral to the fill tube (not shown). This sensor would be integral with the fill tube and hence removed along with the fill tube. Essentially these methods would be a type of fill level gauge that is removed when the fueling is completed.

Figure 7:
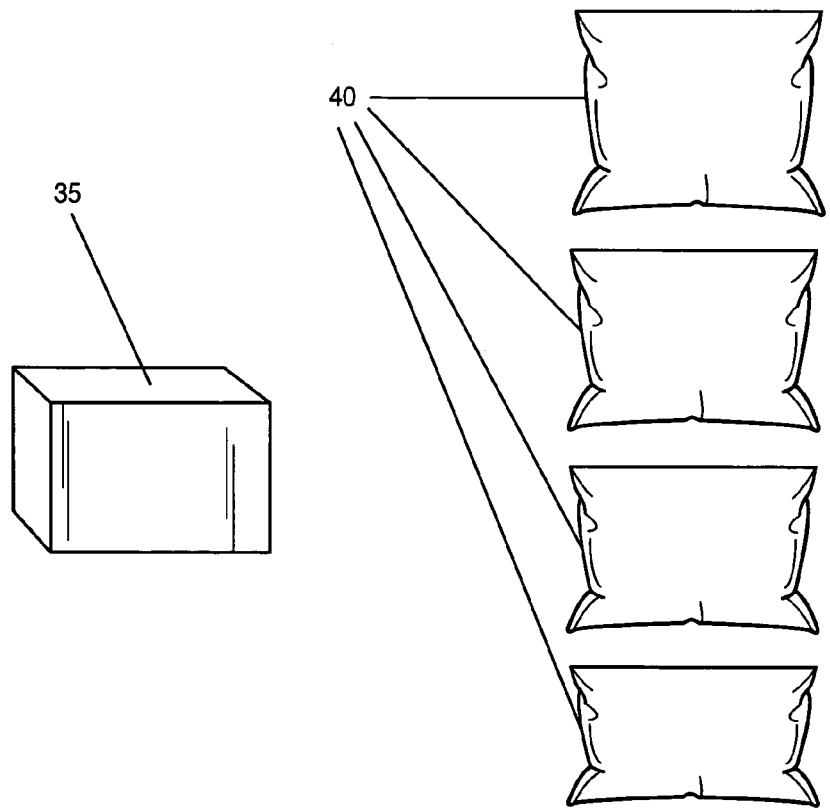
FIG. 7 shows another alternative embodiment when the invention is utilized for bladder type fuel tank designs.

Another conventional fuel tank design consists of the use of soft wall bladders to house the fuel as shown in FIG. 7. These bladder fuel tank liners are usually contained within a hard wall enclosure 35, such as a fuel pod. Different sized fuel bladders 40 can be utilized within this invention. The differing bladder-sizes 40 would be correlated to match specific mission requirements, and the appropriate bladder size selected via the fuel load determining algorithm 5. Bladders 40 will be filled with a specific amount of fuel that corresponds to the result of algorithm 5.

Another approach with soft wall bladders 40 can consist of utilizing one bladder size and partially filling the bladder with differing fuel volumes as determined by the fuel load algorithm. With this approach a syringe is used to fill the bladder entirely. After filling the bladder, an amount of fuel prescribed by the fuel load algorithm is evacuated into the syringe, thus yielding the desired amount of fuel in the bladder independent of whatever amount of fuel was in the bladder prior to initiating the fueling process.

Yet another approach with soft wall bladders can consist of pre-selecting from different sized fuel bladders that correspond to the prescribed fuel volume resulting from algorithm 5 and dispensing the fuel from the selected bladder into the vehicle fuel tank. These various precision sized bladders are used to dispense fuel into the vehicle fuel tank from the selected bladder rather than installing the bladder into the vehicle fuel tank.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A system comprising:
   a computing apparatus, wherein, based on a plurality of predetermined factors associated with a vehicle to be fueled, the computing apparatus calculates a precise amount of fuel to be provided to a fuel tank for the vehicle; and
   a plurality of different sized tubes, wherein each of the plurality of different sized tubes corresponds to a different amount of fuel to be provided to the fuel tank, and wherein one of the plurality of different sized tubes is selected to provide the calculated precise amount of fuel to the fuel tank by extending into the fuel tank by an amount corresponding to the calculated precise amount of fuel.

2. The apparatus of claim 1 wherein said plurality of predetermined factors comprises environmental conditions, payload weight, mission duration and fuel tank geometry.

3. The apparatus of claim 1 wherein each tube of the plurality of different sized tubes comprises a length wherein the fuel enters a bottom of said each tube when the precise amount of fuel is achieved.

4. The apparatus of claim 1 wherein said plurality of different sized tubes is comprised of a telescoping tube.

5. The apparatus of claim 4 wherein said telescoping tube comprises a telescoped length wherein the fuel enters a bottom of said telescoped tube when the precise amount of fuel is achieved.

6. The apparatus of claim 1 wherein said plurality of different sized tubes comprises a series of interlocking tubes.

7. The apparatus of claim 6 wherein each tube of said series of interlocking tubes comprises a length wherein the fuel enters a bottom of said each tube when the precise amount of fuel is achieved.

8. The apparatus of claim 1, wherein each of the plurality of different sized tubes further comprises a bottom and a float valve affixed to the bottom.

9. A method of fueling a vehicle with a precise amount of fuel, the precise amount of fuel being a desired fuel level based on a plurality of predetermined factors, the method comprising the steps of:
   a) calculating the precise amount of fuel based on the plurality of predetermined factors;
   b) selecting a tube corresponding to the calculated precise amount of fuel; and
   c) fueling the vehicle with the precise amount of fuel via the selected tube, wherein the selected tube extends into a fuel tank of the vehicle by an amount corresponding to the desired fuel level for the tank.

10. The method of claim 9 wherein the plurality of predetermined factors comprises environmental conditions, payload weight, mission duration and fuel tank geometry.

11. The method of claim 9 wherein the tube is one of a plurality of tubes from which the tube is selected, and wherein each tube in the plurality of tubes comprises a specific length.

12. The method of claim 9 wherein the step of selecting a tube comprises telescoping the tube to a predetermined telescoping length.

13. The method of claim 9 wherein the step of fueling comprises stopping a flow of fuel when the fuel enters a bottom of the tube.

14. The method of claim 9 further comprising the step of stopping a flow of the fuel with a floating valve.

* * * * *